United States Patent
Polleri et al.

(10) Patent No.: US 12,367,421 B2
(45) Date of Patent: Jul. 22, 2025

(54) AUTOMATED DATA HIERARCHY EXTRACTION AND PREDICTION USING A MACHINE LEARNING MODEL

(71) Applicant: Oracle International Corporation, Redwood Shores, CA (US)

(72) Inventors: Alberto Polleri, London (GB); Lukáš Drápal, Prague (CZ); Filip Trojan, Beroun (CZ); Karel Vaculik, Hluk (CZ)

(73) Assignee: Oracle International Corporation, Redwood Shores, CA (US)

( * ) Notice: Subject to any disclaimer, the term of this patent is extended or adjusted under 35 U.S.C. 154(b) by 1105 days.

(21) Appl. No.: 17/320,534

(22) Filed: May 14, 2021

(65) Prior Publication Data

US 2022/0366298 A1    Nov. 17, 2022

(51) Int. Cl.
| | | |
|---|---|---|
| *G06N 20/00* | (2019.01) | |
| *G06F 16/22* | (2019.01) | |
| *G06F 16/28* | (2019.01) | |
| *G06N 7/01* | (2023.01) | |

(52) U.S. Cl.
CPC ......... *G06N 20/00* (2019.01); *G06F 16/2246* (2019.01); *G06F 16/285* (2019.01); *G06N 7/01* (2023.01)

(58) Field of Classification Search
CPC .......... G06N 20/00; G06N 7/01; G06N 5/022; G06F 16/2246; G06F 16/285
See application file for complete search history.

(56) References Cited

U.S. PATENT DOCUMENTS

| | | | | |
|---|---|---|---|---|
| 10,496,678 | B1* | 12/2019 | Tang | G06F 16/29 |
| 11,196,839 | B1* | 12/2021 | Sonawane | H04L 63/20 |
| 2009/0112865 | A1* | 4/2009 | Vee | G06F 16/35 |
| | | | | 707/E17.084 |
| 2014/0114982 | A1 | 4/2014 | Lamba et al. | |
| 2016/0062993 | A1* | 3/2016 | Lee | G06F 18/24323 |
| | | | | 707/737 |
| 2018/0173768 | A1* | 6/2018 | Troisvallets | G06F 16/24564 |
| 2018/0333140 | A1* | 11/2018 | Wodlinger | A61B 8/488 |
| 2019/0102701 | A1* | 4/2019 | Singaraju | G10L 15/063 |
| 2019/0370600 | A1* | 12/2019 | Deng | G06F 18/2113 |
| 2019/0377794 | A1* | 12/2019 | Li | G06F 40/30 |
| 2020/0226504 | A1* | 7/2020 | Keng | G06N 5/01 |
| 2020/0285943 | A1* | 9/2020 | Perera | G06N 3/048 |
| 2021/0216331 | A1* | 7/2021 | Zeng | G06F 1/3246 |
| 2021/0264520 | A1* | 8/2021 | Cummings | G06Q 40/12 |
| 2021/0357427 | A1* | 11/2021 | Ben Ari | G06F 16/285 |

OTHER PUBLICATIONS

Growing and pruning neural tree networks.IEEE Transactions on Computers, vol. 42, No. 3, Mar. 1993 (Year: 1993).*

* cited by examiner

*Primary Examiner* — Hien L Duong
(74) *Attorney, Agent, or Firm* — Invoke

(57) ABSTRACT

Techniques are disclosed for revising training data used for training a machine learning model to exclude categories that are associated with an insufficient number of data items in the training data set. The system then merges any data items associated with a removed category into a parent category in a hierarchy of classifications. The revised training data set, which includes the recategorized data items and lacks the removed categories, is then used to train a machine learning model in a way that avoids recognizing the removed categories.

18 Claims, 5 Drawing Sheets

| Hierarchy Level | Hierarchical Classification |
|---|---|
| 1 | A1 |
| 2 | A1/B1 & A1/B2 |
| 3 | A1/B1/C1 & A1/B1/C3 A1/B1/C2 A1/B1/C4 |

Tree Representation of Hierarchy

AUTOMATED DATA HIERARCHY EXTRACTION AND PREDICTION USING A MACHINE LEARNING MODEL

TECHNICAL FIELD

The present disclosure relates to characterizing data items using a machine learning model. In particular, the present disclosure relates to revising a training data set to generate a revised training data set for training the machine learning model.

BACKGROUND

Classification of data items is a commonly used process. In many situations, classifications may be manually encoded in a rule base and subsequently applied to incoming data items. Manually classifying data items is laborious in even the best circumstances. For modern data systems that process millions or billions of data items an hour (e.g., clickstream data, electronic communication traffic), manual classification of data items is not feasible. In other situations, a type of machine learning model known as a classifier may be trained using target data. Once trained, the classifier may group target data items according to its training. While a more practical solution for high data volume environments, a traditional classifier may produce classifications that are inaccurate or not informative. This is because the data used to train the classifier may include classes with very few observations. Thus trained, the model may classify target data according to these statistically questionable or otherwise uninformative classes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
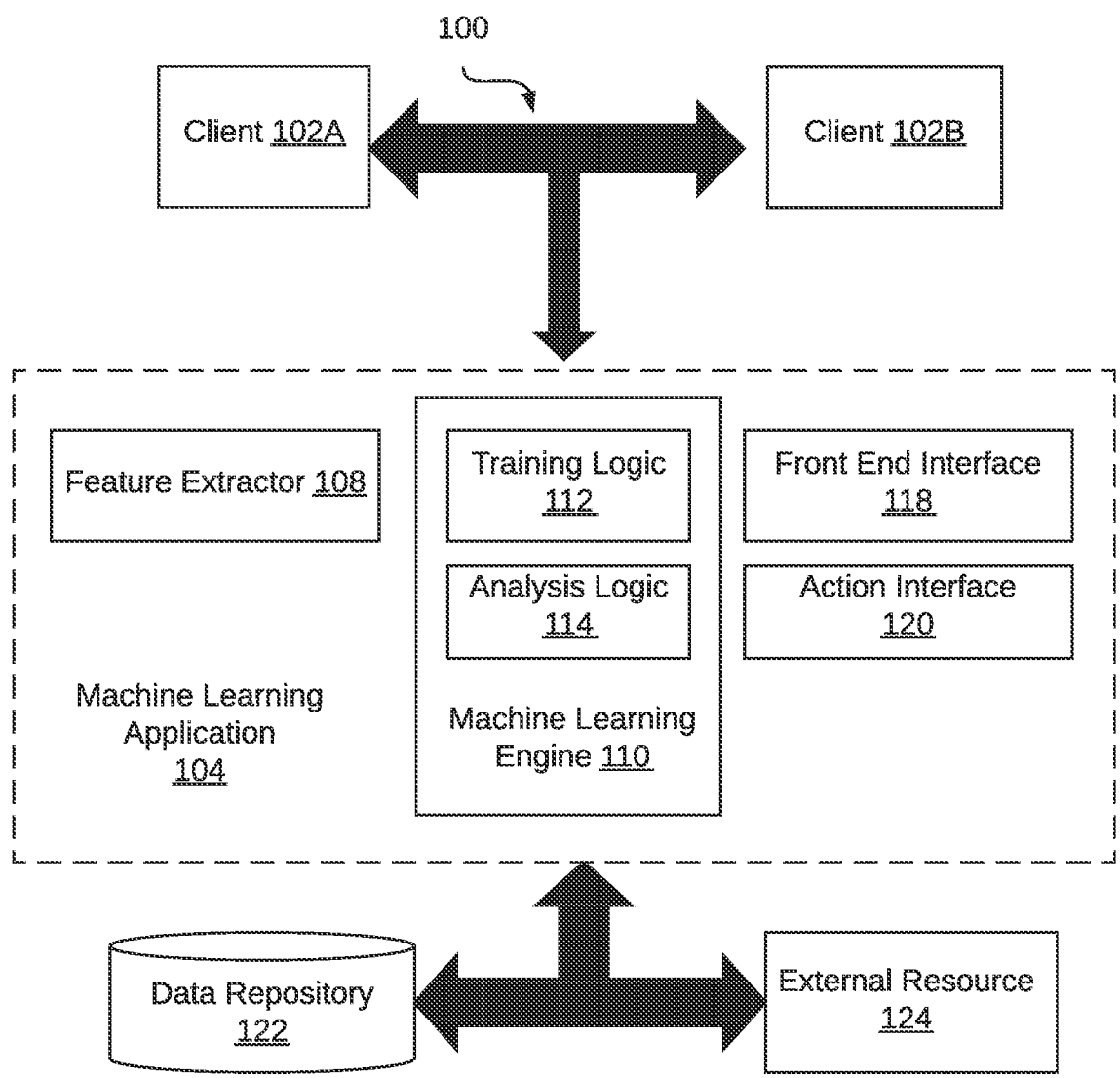
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. EXTRACTING AND PRUNING A HIERARCHICAL CLASSIFICATION
4. NON-MANDATORY LEAF ASSIGNMENTS FOR TARGET DATA
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

One or more embodiments generate or modify training data for a machine learning model that classifies data items. Training data includes data items labeled with corresponding categories. Generating the training data for the machine learning model includes identifying categories for an initial set of data items, removing at least a subset of the identified categories, and reassigning data items that were assigned to the categories being removed.

The system analyzes a set of data items to generate a hierarchical classification of categories. Categories within the hierarchical classification of categories may be represented by nodes in a hierarchical tree. Each category, represented by a node, is a sub-category of a category represented by the parent node. The root node may represent all categories. A data item may be assigned to a category represented by a leaf node or a category represented by a non-leaf node in the hierarchical tree.

If the number of data items, assigned to a particular category represented by a leaf node, does not meet a threshold level of data items, the system prunes the particular leaf node from the hierarchical tree. Furthermore, the system reassigns the data items, assigned to the particular category, to a parent category of the particular category. Subsequent to reassignment of the data items, the data items are used to train a machine learning model with the assigned category serving as a label in a supervised learning algorithm. The system applies the trained machine learning model to classify new data items.

One or more embodiments described in this Specification and/or recited in the claims may not be included in this General Overview section.

2. Architectural Overview

As indicated above, a traditional classifier may include a number of classes and/or categorizations that are not ultimately useful. For example, some classes that the classifier is trained to recognize may be based on a few number of observations (e.g., data items) in the training data. Because traditional classifiers may have a high level of signal discrimination, even classes with a low number of observations (e.g., 1, 2, fewer than 5 or 10, or less than a statistically-derived sample size) may be distinctly identified in training data. Once trained, the classifier may apply this level of discrimination to target data thereby possibly distinguishing many classes with a low number of observations. This granularity in analysis may not only be not useful, it may even be misleading to subsequent analyses of the data by obscuring the presence of larger, and more useful, data characterizations. One example benefit of some of the embodiments described below is generating a hierarchical classification that avoids classifications with a low number of observations.

Another example benefit is that some of the embodiments described below increase a signal to noise ratio within the observed data. For example, in traditional situations a machine learning model may classify data into categories, some of which may include a low number of observations (e.g., 1, 2, fewer than 5 or 10, or less than a statistically-derived sample size). In these situations, the presence of low-observation categories may cause the machine learning model to have too few observations to detect a relationship between some data attributes and a variable of interest. In other words, this classification of data may have a low "signal to noise" ratio. This may prevent the machine learning model from generating predictions or generating accurate predictions. By applying some of the following techniques and "pruning" a hierarchy, the system may increase the signal to noise ratio. This, in turn, improves the ability of the machine learning model to detect relationships between data attributes and variables, thereby improving the ability of the machine learning model to make predictions.

FIG. 1 illustrates a system 100 in accordance with one or more embodiments. As illustrated in FIG. 1, system 100 includes clients 102A, 102B, a machine learning application 104, a data repository 122, and external resource 124. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to execute events (e.g., computing system-based transactions) and transmit the data items corresponding to events to the ML application 104 for analysis. The ML application 104 may analyze the transmitted data items to extract a hierarchical classification associated with the data items. The ML application 104 may also remove classes or sub-classes (e.g., represented by leaf nodes or non-leaf nodes in an acyclic hierarchical classification graph) that are associated with a number of data items ("observations") below a minimum number, as described herein. This "pruning" process has the effect of improving the relevance of the extracted hierarchy and the hierarchical classification when applied to target data.

The clients 102A, 102B may also include a user device configured to render a graphic user interface (GUI) generated by the ML application 104. The GUI may present an interface by which a user triggers execution of computing transactions, thereby generating data items. In some examples, the GUI may include features that enable a user to view training data, classify training data, generate a hierarchical classification graph (equivalently, extract a taxonomy from a data set), and other features of embodiments described herein. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate, thereby further revising or validating training data. In some examples, a user may label, using the GUI, a machine learning analysis of target data generated by the ML application 104, thereby revising the categorizations, leaf nodes, non-leaf nodes, and/or minimum data item threshold level for a corresponding node. This latter feature enables a user to label target data analyzed by the ML application 104 so that the ML application 104 may update its training.

In some examples, the machine learning (ML) application 104 is configured to receive training data. As a part of training and/or once trained and applied to target data, the ML application 104 may: (1) analyze characteristic associated with a data items (whether for training data or target data); (2) generate, based on the characteristics, a hierarchical classification of categories associated with the data items, where the categories may be represented by leaf or non-leaf nodes; and (3) remove one or more nodes and their corresponding categories upon detecting that the one or more nodes are associated with a number of data items below a minimum data item threshold.

In some embodiments, the hierarchical classification of categories generated by the ML application 104, as described herein, may include, for each data item, a set of increasingly specific classification and sub-classifications with more specific sub-classifications nested within more general classifications and/or sub-classifications. As used herein, a hierarchical classification may, in some embodiments, be considered as the collective set of classifications from a broadest category to a narrowest category. An illustration of such a hierarchical classification, provided for convenience of illustration, is that of identifying a data item as an image of a plant, that is a tree, more specifically a deciduous tree, even more specifically a deciduous tree possessing a simple leaf, more specifically a deciduous tree with a simple leaf that is an oak tree, and even more specifically, a swamp white oak. Using a more concise notation, this progression of categories from broad to narrow may be represented as "plant>tree>deciduous>simple leaf>oak>swamp white oak."

Graphically, this hierarchical classification may be represented as a tree of nodes. A single node at a "first" or top-most level in the tree may represent all categories or the broadest category or classification with which a data item is associated. Nodes at successively lower levels (e.g., a second level immediately below the top-most level, a third level immediately below the second level) may represent successively narrower categories within the broadest category. A bottom-most level of a tree may be referred to as a "leaf" or node and represent a most specific sub-category nested within the various categories and sub-categories represented by higher node levels in the tree.

In some examples, as explained below, the ML application 104 may remove a leaf node (or even a non-leaf node) and its corresponding categorization if the leaf node is associated with an insufficient number of data items. When this "pruning" process is applied to training data, the pruning process has the effect of removing the low-observation categorization as an option to be applied to target data. This in turn improves the computing productivity and efficiency of the ML application 104. This pruning process also improves the utility of the hierarchical categorization predictions generated by the ML application 104 when applied to target data because obscure or less useful hierarchical categorizations are removed. In this way, the data items of a set, and corresponding characteristics of the data items, are consolidated into a more useful hierarchical classification where the remaining categories and sub-categories are associated with a number of associated data items that is statistically sufficient. In some examples, statistically sufficient may mean that the number of observations associated with a category (e.g., a node) meets a minimum sample size and/or has enough observations so that confidence intervals and means values (e.g., measures of data centroids and variance) enable categories to be distinguished from one another.

The machine learning application 104 includes a feature extractor 108, a machine learning engine 110, a frontend interface 118, and an action interface 120.

The feature extractor 108 may be configured to identify characteristics associated with data items. The feature extractor 108 may generate corresponding feature vectors that represent the identified characteristics. For example, the feature extractor 108 may identify event attributes within training data and/or "target" data that a trained ML model is directed to analyze. Once identified, the feature extractor 108 may extract characteristics from one or both of training data and target data.

The feature extractor 108 may tokenize some data item characteristics into tokens. The feature extractor 108 may then generate feature vectors that include a sequence of values, with each value representing a different characteristic token. The feature extractor 108 may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only. Other types of models may be used for tokenizing characteristics.

The feature extractor 108 may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) to assign to one or more characteristics of a set of characteristics described by a feature vector. In some examples, a label may indicate one or more classifications associated with corresponding characteristics.

As described above, the system may use labeled data for training, re-training, and applying its analysis to new (target) data.

The feature extractor 108 may optionally be applied to target data to generate feature vectors from target data, which may facilitate analysis of the target data.

The machine learning engine 110 further includes training logic 112, and analysis logic 114.

In some examples, the training logic 112 receives a set of data items as input (i.e., a training corpus or training data set). Examples of data items include, but are not limited to, electronically rendered documents and electronic communications. Examples of electronic communications include but are not limited to email, SMS or MMS text messages, electronically transmitted transactions, electronic communications communicated via social media channels, click-stream data, and the like. In some examples, training data used by the training logic 112 to train the machine learning engine 110 includes feature vectors of data items that are generated by the feature extractor 108, described above.

As described below in more detail, training data used by the training logic 112 to train the machine learning engine 110 may be "pruned" to improve the accuracy of the hierarchical classification (also referred to as a "taxonomy"). Categorizations, that is a certain combination of characteristics that the system associates with a set of increasingly more specific, hierarchically arranged sub-categories that are associated with too few data items may be removed from training data by the training logic 112. By removing these identified categories with too few data items, and the associated node(s) from the hierarchical categorization, the system improves the utility of the training data. That is, categories that may be artifacts that arise from a statistically insufficient sample size (e.g., less than 20 data items or less than a sample size calculated as a minimum according to a statistical model) or that may occur too infrequently to be useful (e.g., below a designed threshold number) are removed from the training data. By removing these categories from the training data, the system is not trained to recognize these statistically insufficient (and thus "pruned") categories.

Furthermore, as described below, the data items and their corresponding characteristics may be associated instead with a category/node at a higher level in the training data. In this way, the training data removes the categories with a low observation count, without removing the data items themselves from the training data.

Examples of operations for this pruning process are described below with reference to FIG. 2.

The training logic 112 may be in communication with a user system, such as clients 102A, 102B. The clients 102A, 102B may include an interface used by a user to apply labels to the electronically stored training data set.

The machine learning (ML) engine 110 is configured to automatically learn, via the training logic 112, a hierarchical classification (sometimes described as an "extracted taxonomy") of data items. The trained ML engine 110 may be applied to target data and analyze one or more characteristics of the target data. These characteristics may be used according to the techniques described below in the context of FIGS. 2 and 3.

Types of ML models that may be associated with one or both of the ML engine 110 and/or the ML application 104 include but are not limited to linear regression, logistic regression, linear discriminant analysis, classification and regression trees, naïve Bayes, k-nearest neighbors, learning vector quantization, support vector machine, bagging and random forest, boosting, backpropagation, neural networks, and/or clustering.

The analysis logic 114 applies the trained machine learning engine 110 to analyze target data, such as event data (e.g., event attributes, times, and the like). The analysis logic 114 may analyze data items to identify a hierarchical classification of the data items using the trained ML model.

In one example, the analysis logic 114 may identify equivalent and/or comparable characteristics between one or more data items in target data and the training data. In some examples, the analysis logic 114 may include facilities for natural language processing so that comparable characteristics of data items in target data and training data may be identified regardless of differences in wording. Examples of natural language processing algorithms that the analysis logic 114 may employ include, but are not limited to, document term frequency (TF), term frequency-inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

In some examples, once the analysis logic 114 identifies characteristics in target data and corresponding characteristics in training data, the analysis logic 114 may determine a similarity between the target data characteristics and training data characteristics. For example, the analysis logic 114 may execute a similarity analysis (e.g., cosine similarity) that generates a score quantifying a degree of similarity between target data and training data. One or more of the characteristics that form the basis of the comparison between the training data and the target data may be weighted according to the relative importance of the characteristic as determined by the training logic 112. In another example, such as for a neural network-based machine learning engine 110, associations between data items are not based on a similarity score but rather on a gradient descent analysis sometimes associated with the operation of neural networks.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface of events (e.g., a triggering event, sets of candidate events, associated analysis windows). In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

In some embodiments, the machine learning application 104 may access external resources, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 6, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

Information related to target data items and the training data may be implemented across any of components within the system 100. However, this information may be stored in the data repository 122 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Extracting and Pruning a Hierarchical Classification

Figure 2:
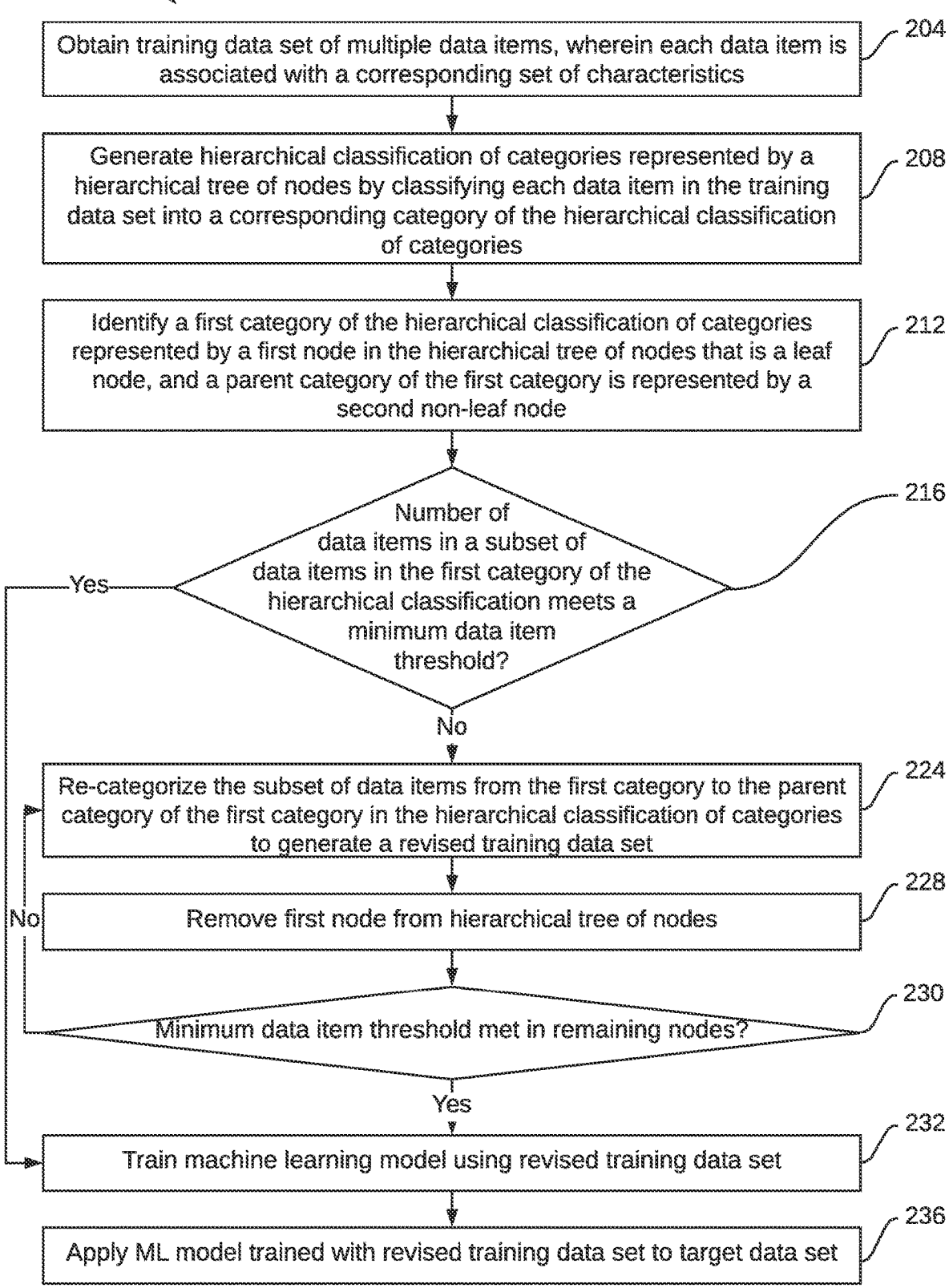
FIG. 2 illustrates an example set of operations for extracting a hierarchy from a training data set, pruning categories from the data set, and using the pruned (revised) data set to train a machine learning model in accordance with one or more embodiments.

FIG. 2 illustrates an example set of operations, collectively referred to as a method 200, for selectively "pruning" a set of training data. As indicated above, this pruning includes identifying and removing categories of a hierarchical classification of the data items (and their associated nodes) from training data, in accordance with one or more embodiments. Once processed according to some operations of the method 200, a system may use the pruned training data set to train a machine learning (ML) model. As described above, this improves the usefulness and efficiency of operation of the trained ML model because categories that are associated with too few data items may not accurately represent the data and therefore may train the ML model to inaccurately categorize data. One or more operations illustrated in FIG. 2 may be modified, rearranged, or omitted all together. Accordingly, the particular sequence of operations illustrated in FIG. 2 should not be construed as limiting the scope of one or more embodiments.

The method 200 begins by obtaining a training data set of data items (operation 204). Examples of data items that may be assembled as the training data set include, but are not limited to, electronically renderable documents, electronic data objects, and the like. Examples of electronically renderable documents may include documents generated by a text editing program (e.g., Microsoft® Word®), structured and unstructured documents (e.g., those generated by or stored as Adobe® Acrobat®, Adobe® Photoshop®) of all types, image files, and the like. Examples of electronic data objects may include electronic communications that include, but are not limited to, email messages, SMS and/or MMS text messages, and/or other instant messaging services. In some examples, electronic communication data items may also include electronic communications communicated via social media channels.

In still other examples, the data items may include files, records, objects, or other data structures generated by electronically transmitted transactions. Embodiments of these types of data items include, for example, clickstream data generated by the selective engagement of graphic user interface elements on a website by a user. In another embodiment, these data may be generated by the submission of electronic forms presented to a user via an application or website.

Regardless of the source of the data items collected as the training data set, each of the data items is associated with a set of one or more characteristics (operation 204). As explained below in more detail, these characteristics of the data items in the training data set may be used to determine a hierarchal classification by which the data items are categorized. Examples of characteristics include a source of the data item, such as an originating website, application, program, or initiator of the communication (e.g., a sender of an email or other electronic communication). Another example of a characteristic is the communication protocol used to generate and/or transmit the data item. In some embodiments, this may include various protocols of the internet protocol (IP) suite as well as additional, proprietary protocols that may transmit the data item alone or in cooperation with the IP suite protocols. Similarly, other characteristics may include wireless transmission protocols (e.g., IEEE 802.11 protocols) and security protocols.

Other examples of characteristics may include routing information, such as that found in a header of a data packet used to transmit the data item through a packet-switched network. Other characteristics may include device identifiers (e.g., IP addresses, media access control (MAC) identifiers) and/or device types for devices used to generate and/or transmit the data item. Device types may include one or more of an end-user device type, such as a mobile computing device, or a stationary device such as a network appliance (e.g., a server, switch, and/or router).

Other examples of characteristics include the content of the data item itself. For example, the system may use natural language processing (NLP) techniques, such as those described above in the context of FIG. 1, to identify content in a data item. The system may use selected aspects of the identified content as characteristics, whether terms, words, sequences of words, reference numbers (e.g., SKU numbers or other product identifiers), product names, service names, other identifiable subjects and/or content, and the like.

In some examples, the system may identify an organization and/or sub-unit within an organization as a characteristic. For example, the system may use routing data or NLP to identify an organization, an organizational unit (e.g., a division), and/or an organizational sub-unit (e.g., a department within a division) as one or more of a source, a destination, and/or an intended audience of a data item. The system may determine any of these organizational characteristics using one or more of NLP, deep packet inspection and/or routing data described above.

The system may also detect user profile data (e.g., of the originator and/or recipient), geolocation data, and the like as characteristics.

The system may analyze the detected characteristics to generate a hierarchical classification by which each data item is categorized (operation 208). In some embodiments, the hierarchical classification is not known in advance by the system but is instead determined, either in whole or in part, by analyzing the characteristics associated with the data item of the training data set. In some contexts, the system generation of the hierarchical classification is described, equivalently, as "taxonomy extraction."

In some examples, the system may determine a hierarchy by identifying successively narrower categories by identifying characteristics separated by a known separator. That is, the system may be trained to identify a series of characteristic values in a data item, where each characteristic value in the series corresponds to an increasingly narrow sub-category. Collectively the identified sub-categories can form a classification. Examples of hierarchy separators include punctuation (commas, semicolons, colons) or other characters (asterisks, carets, tildes) and the like.

In various embodiments, the operation 208 may generate the hierarchical classification using one or more classifier machine learning models and/or algorithms. Examples of classifiers include, but are not limited to, K-means clustering, means-shift clustering, density-based clustering algorithms, agglomerative hierarchical clustering, and other similar models.

The system may generate the hierarchical classification using any of a number of techniques, that may be generically grouped into three approaches sometimes referred to as (1) "global," (2) "local," and (3) "flat." The global approach analyzes characteristics to generate a hierarchical classification by first detecting more general categories and subsequently detecting increasingly more specific categories and sub-categories within a more general "parent" category. Referring to a tree analog (or "acyclic graph") of the hierarchical classification, the global approach detects a top-most level of the tree structure and then progressively identifies categories at successively lower levels (or tiers) in the tree structure. The global approach may be thought of as collectively analyzing the multiple sub-categories within a highest level in a single analytical iteration.

The local approach may use multiple classifiers and/or classifier algorithms to identify classifications of peer groups of classifications. In other words, multiple classifiers may be trained and applied to classify data items to a particular node or within a particular tier of nodes in the tree structure.

The flat approach executes a multi-class classification analytical process to determine characteristics associated with leaf nodes. Once this "lowest" layer of classifications in the tree structure is identified, the system may then continue to apply the flat analytical approach to identify successively higher categories (or nodes) in the classification system. Because the flat approach generates a hierarchical classification from the "bottom" of the hierarchy (i.e., the leaf nodes of a tree) up, the flat approach may be thought of as not considering the hierarchical structure during the training phase.

Note that in some embodiments, as described herein the system may not necessarily terminate every branch of the tree structure in a leaf node. That is, a classification may not include a value for the most specific type of category (at a "bottom" level of the tree) in a set of nested, increasingly specific classifications. Instead, in some embodiments a classification of a data item may terminate in a non-leaf node that represents a level of categorization that is more general (i.e., less specific) than the most specific level used in other portions of the tree. Terminating a hierarchical classification in a non-leaf node may be applied as part of the training process by merging data items with a leaf node into a parent node and removing the leaf node and corresponding classification from a hierarchical structure. This technique may be referred to as "non-mandatory leaf assignment" because some classifications may terminate at a non-leaf node.

Depending on the type of data items analyzed in the operation 208, the hierarchical classification may include at least tens, hundreds, thousands, or tens of thousands of categories and nodes that represent the categories in a graphic representation of the categories. However, as described above, some of these many categories may be associated with too few data items to constitute a statistically meaningful or an operationally useful category. Instead, these categories may represent aberrations, exceptions, or rare occurrences that are more properly incorporated into a parent category. The following operations 212-236 of the method 200 describe operations that remove ("prune") these distracting, misleading, or unhelpful categories from the hierarchical classification. This pruning process improves the quality of the classified data, the computational efficiency of training the ML model, and the computational efficiency of applying the trained ML model to target data.

When generating the categories of the hierarchical classification, and equivalently the graphical analogs thereof as nodes of a tree, the system also generates a probability associated with each category/node. The probabilities in the training data are calculated based on the proportion in which a particular category is found in the training data. Furthermore, these probabilities are presumed to be approximate a rate at which data of a particular category will be present in target data. In this context, "approximate" may mean within +/−5% or with a measure of variance calculated by statistical methods. This presumption regarding probabilities of categories within target data is explained in more detail below. Furthermore, this presumption assumes that a number of events in the category is statistically sufficient. A statistically sufficient sample size for a given confidence interval may be calculated using known statistical calculation techniques.

As described below, because the system is configured to generate a classification of a data item by identifying a category for each successively more specific level within a hierarchy, a total probability from summing the probabilities of the individual categories in a same level will total one. This probability of one for each level within the hierarchy is maintained even when, as described below, some "child" categories are merged into a connected parent category. In some embodiments (as described in the context of the operation 230), a "parent" category need not merely a category that is one level "higher" in the hierarchy but may include indirectly connected "grandparent" categories that are two, three, or more levels higher than the pruned category. In some embodiments, this distinction is relevant for situations in which a parent of a pruned category itself has too few observations and the pruning process is applied iteratively until a desired number of data items in a category is achieved.

Continuing with the method 200, the system identifies a category in the hierarchical classification of categories that is represented by a first node in the corresponding hierarchical tree of nodes (operation 212). In this illustration, the identified first node may be a leaf node. The identified first node may be associated with a second, non-leaf node that is a "parent" of the leaf node. In terms of the relationship between the (first) leaf node and the (second) non-leaf node, the leaf node is a sub-set classification that is logically contained within the broader, more general, non-leaf parent node. In terms of a graphical representation of the hierarchical classification of categories, the leaf node is a terminal node of a "branch" of a tree at a lowest (and most specific) level of the tree whereas the parent node is at a higher level in the tree.

Once identified, the system determines whether a number of data items associated with the leaf node meets a minimum threshold of data items (operation 216). In other words, the system may determine whether the sub-set of data items of the more specific category (leaf node) meets a minimum threshold.

The operation 216, along with subsequent operations, ensures each category has a minimum number of data items associated with it. In some examples, the goal of this minimum number of data items for each remaining category in a hierarchical classification ensures that the different categories are statistically distinguishable from one another. For example, a minimum number of data items may help ensure that confidence intervals associated with different categories (nodes) in a same level have mean values and confidence intervals that do not overlap with their peer nodes.

In some examples, the system performs the operation 216 and subsequent operations 224 and 228 in a "bottom-up" approach. That is, the system analyzes the bottom-most leaf nodes (equivalently, the most specific categories in the hierarchical classification of categories) first. This "bottom-up" approach is computationally efficient because it enables the convenient re-categorization of data items and the corresponding re-calculation of data item prevalence (i.e., probability of occurrence) in the training data set on a level-by-level basis within the hierarchy.

Alternatively, in some examples the system performs the operation 216 and subsequent operations 224 and 228 in a "top-down" approach.

In one embodiment of a top-down approach, the system may compute a total number of data items represented by the direct and indirect child nodes of any particular node. In some examples, the direct and indirect nodes analyzed may be from a particular node of interest, whether a root node or an intermediate (i.e., non-terminal) node selected for its relevance to a particular analysis. In some embodiments, this analysis does not include data items assigned to the particular node itself without a further categorization of the data item to a child node of the particular node. A total number of data items is assigned to one or more of direct child nodes and/or indirect child nodes may be computed when the tree is generated. Direct child nodes are those one level below, and connected to, the particular node without any intervening nodes. Indirect child nodes are nodes one or more levels below the particular node and connected via at least one intervening node to the particular node. The system detects the total number of data items associated with each child node by, for example, incrementing a counter for a particular node each time a data item is assigned or detected as assigned to a child node that corresponds to the particular node.

Thereafter, the system traverses the nodes in a breadth-first or depth-first traversal. If the total number of data items assigned to direct and/or indirect children of a particular node does not meet a threshold, then those direct and/or indirect children of the particular node are pruned, and the corresponding data items are reassigned to the particular node. In one illustration of the efficiency advantage presented by this top-down approach, a single data item with ten sub-categories may be pruned in one operation by cutting all ten sub-categories and reassigning the associated data items to the parent category where other data items are all assigned.

In some examples, the system determines a minimum threshold of data items associated with a node by applying a statistical calculation to determine confidence interval associated with the data. For example, the system may generate a deviation, a standard deviation, or other measurement of statistical variance to determine whether the number of data items associated with the leaf node is sufficient. In other examples, the system may base a threshold on a confidence interval and determine whether the number of data items and their corresponding values fall within the required confidence interval. In other embodiments, the threshold may be calculated based using statistical sampling sample size calculations or may otherwise be set at a designated value for convenience.

If the system determines that the minimum data item threshold is met by the first data item, then the system may proceed from the operation 216 to the operation 232. The operation 232 is described below.

However, if the system determines that the threshold number of data items is not met, then the system proceeds to the operation 224. More specifically, the system recategorizes the subset of data items from being associated with the numerically deficient leaf node to being associated with the parent node (operation 224). This re-categorization may include storing a categorization in association with the data items that omits the most specific categorization formerly associated with the leaf node and instead is limited to the categorization associated with the parent node. In some examples, the system may represent or encode this re-categorization by editing labels associated with the feature vector(s) of the data items formerly associated with the leaf node.

Not only does the system re-categorize the data items themselves, but the system also removes the category corresponding to the leaf node from the hierarchical classification generated in the operation 208. By removing this specific category from the generated hierarchical classification of categories, the system generates a revised training data set in which the category associated with the removed leaf node is no longer present in the data. That is, the association between data item characteristics and the categorization associated with the leaf node is removed from the training data. Instead, the system revises the association between the characteristics of the data items from the removed category to the parent category.

Correspondingly, the system also removes ("prunes") the leaf node from the hierarchical tree of nodes that is the graphical representation of the classification (operation 228). Removing the category associated with too few data items, and removing the corresponding node, may improve the distinguishability of nodes from one another by improving the statistics associated with the remaining leaf and/or non-leaf nodes. The operation 228 may also improve the computational efficiency of the hierarchical classification when applied to target data.

Upon removing the categories (and corresponding nodes in a tree graphical representation) from the hierarchical classification, the system also sets the probability for the removed categories (and their corresponding nodes) to zero. The probability formerly associated with the removed category is merged with the parent. In some examples, this merging of probabilities is not simply an arithmetic sum of probabilities. Rather the system recalculates probabilities associated with each category (e.g., each corresponding node in the tree) based on the re-distributed population of events. In other examples, this merging of probabilities is an arithmetic sum of probabilities of the removed node and the parent node, adjusted so that a sum of probabilities of the categories/nodes in a level totals one.

The system may then determine whether the remaining nodes have a sufficient number of data items in a process that is analogous to that of the operation 216, except that some of the remaining nodes include those from pruned "child" nodes (operation 230). If the system determines that the remaining nodes do include a sufficient number of data items, the method 200 proceeds to the operation 232. If one or more of the remaining nodes is not sufficient, then the operations 224 and 228 may be repeated at successively higher levels as needed so that, when completed, each category/node in the hierarchical classification has a number of associated data items that meets the minimum data threshold. This iterative is indicated by the arrow in FIG. 2 connecting the operation 230 to the operation 224.

The system may then train the machine learning model using the revised training data set (operation 232). Examples of machine learning models and training techniques are described above in the context of FIG. 1.

By using the revised training data set to train the machine learning model, the system prevents future classification of data items to the pruned leaf node and its corresponding classification. In other words, removing the leaf node and its classification prevents target data from being categorized into the removed leaf node.

Operation 236 may execute a "non-mandatory leaf assignment" process by which the machine learning model, trained using the revised training data, analyzes target data. The operation 236 is described in more detail in the context of FIG. 3.

4. Non-Mandatory Leaf Assignments for Target Data

Figure 3:
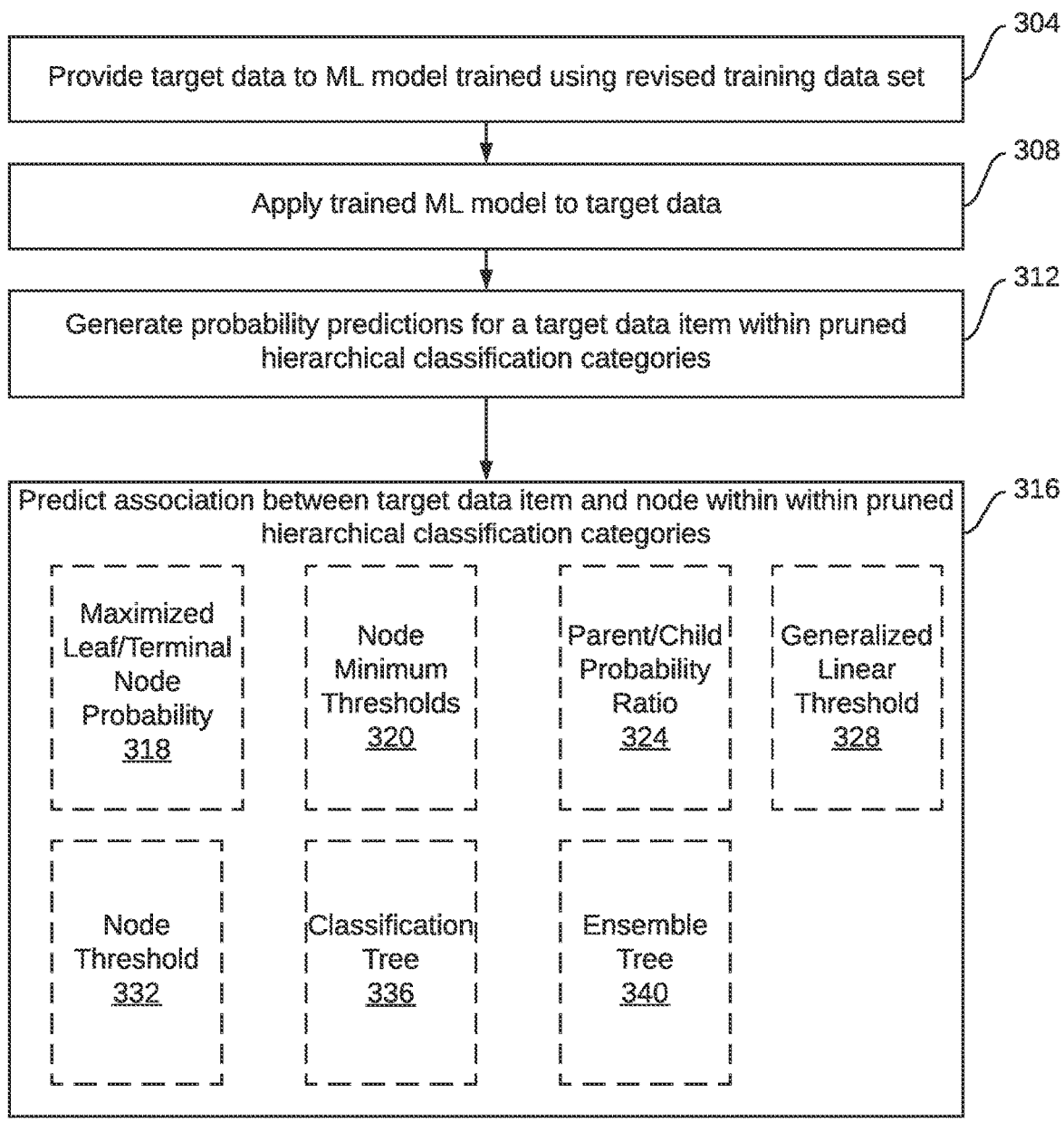
FIG. 3 illustrates an example set of operations for applying a machine learning model trained using a revised data set to categorize data items in a target data set in accordance with one or more embodiments.

FIG. 3 illustrates an example set of operations, collectively referred to as a method 300, for selectively applying the ML model training according to the method 200 to a target data set of data. By applying the ML model trained with the revised training data set, a system may classify a set of target data items according to the hierarchical classification of categories that no longer includes the "pruned" categories/nodes. The method 300 is a more detailed representation of the operation 236 represented in FIG. 2. One or more operations illustrated in FIG. 3 may be modified, rearranged, or omitted all together. Accordingly, the particular sequence of operations illustrated in FIG. 3 should not be construed as limiting the scope of one or more embodiments.

The method 300 begins by providing target data to a trained ML model (operation 304). In this case, the trained ML model has been trained using a training data set that has been revised according to the method 200 so as to not include some categories and their associated nodes (operation 304). Similar to the training data, the target data provided to the trained ML model may include a set of data items. These data items may be associated with one or more characteristics, analogous to those described above in the context of the method 200.

Once provided, the system may apply the trained ML model to the target data (operation 308). That is, the system may analyze the data items in the set of data items to detect the characteristics associated with the various data items. As described above, these characteristics may be associated with a recipient, a source, and/or a topic or subject of the data item (as identified by NLP or other machine learning technique). Additional characteristics may be associated with a network path taken to transmit the data item, a protocol used to encode the data transmitted via a packet switched network, among others.

The system may identify the collective attributes of the set of data items as a whole and/or identify characteristics associated with individual data items in the set. By identifying characteristics associated with the set of data items collectively and the data items individually, the system may then generate a hierarchical classification of the data set as a whole as well predict a classification for individual corresponding data items in the data set.

Based on the characteristics, the system generates a predicted probability for a target data item within the pruned hierarchical classification (operation 312). As described above, the predicted probability for a target data item is generated using the ML model trained with the revised (i.e., pruned) data set. The operation 312 can be performed for one or more of the target data items in the target data set.

The operation 312 can collectively analyze the target data set so that the trained ML model predicts probabilities for each node in the pruned hierarchical classification. In some examples, the system may generate a predicted probability by measuring the prevalence (or proportion) of the set of characteristics associated with a particular node in the target data. In some examples, the system may generate these probabilities from the terminal leaf or terminal non-leaf nodes and then collectively sum the probabilities in child nodes as the probability for a connected parent node. In some examples, the system requires that the individual probabilities for the various nodes for each level of the hierarchy sum to one. In some examples, the system may generate probabilities from the bottom level of the hierarchy first. The probabilities of the parent nodes to the bottom level nodes may then simply be generated by summing the probabilities of the connected child nodes. This technique may be repeated at successively higher levels of the hierarchy. In other words, by starting from a bottom-most level (e.g., most specific) of the hierarchy, probabilities of higher level nodes are a function of the hierarchical structure itself (e.g., via the probabilities associated with connected child nodes).

The system may apply the trained ML model to a specific target data item to classify the target data item, or more specifically, predict an association with a node according to the pruned hierarchy. In some examples, a predicted node for a target data item is not a terminal or leaf node. Instead, a "non-mandatory leaf assignment" process may be used. In this technique, the system may predict a non-terminal node as most likely associated with a target data item. As described below in more detail, a non-terminal leaf may be associated with a particular data item for a variety of reasons. For example, some operations may identify an equal or otherwise indistinguishable probability between peer terminal nodes for a particular data item, but a higher probability that the target data item is associated with a particular parent node. In this case, the system may select the particular parent node as the predicted classification in preference to the nearly indistinguishable probabilities associated with the terminal nodes. In some situations, the system may identify the particular parent node because of its higher probability relative to a peer parent node with a lower probability. Other example applications of this non-mandatory leaf assignment system are explained below.

In other examples, the system may generate a predicted probability by, at least in part, using a similarity analysis (e.g., cosine similarity) to identify a probability that a data item in the target data and its particular combination of characteristics is associated with a particular node and the characteristics associated with the node classification.

In some examples, the system may apply known hierarchical metrics such as a hierarchical precision metric, a hierarchical recall metric, or a hierarchical f1 score to generate and/or refine node probabilities (e.g., used in combination with population prevalence and/or machine learning prediction techniques described above) as part of executing the operation 312.

In some examples, the system may be applied to a particular target data item to identify a node of the pruned hierarchical tree that the particular target data item is likely to be associated with (operation 316). The techniques used to evaluate a target data item are described below as operations 318-340 which are depicted in FIG. 3 as optional sub-operations of the operation 316.

In one example, the system may analyze the particular target data item and its corresponding characteristics to select a terminal node having a highest probability (operation 318). A relevant "branch" of the hierarchy is identified by comparing the characteristics of the particular target data item to those associated with the nodes of the pruned hierarchical classification. From the proper branch, a terminal (leaf or non-leaf) node is selected as representing the particular target data item by identify the terminal node in the proper branch having the highest predicted probability. Because the system selects the terminal node for the particular target data item from the pruned hierarchy, the confidence interval associated with the node and the prediction is sufficient to meet any statistical criteria applied earlier in the process (e.g., the method 200).

Turning to the operation 320, the system may be configured to identify a node that may be at a non-terminal level in the hierarchical classification. This may be accomplished in the operation 320 by setting a minimum probability value at each level of the hierarchical classification. The system then analyzes a target data item starting from the "bottom" of the hierarchy (e.g., the most specific categories/terminal nodes). If the minimum probability value is not met by categories of the lowest level in the tree that are relevant (or similar) to the characteristics of the target data item, the system analyzes parent nodes (or successively higher levels in the hierarchical classification) connected to the relevant terminal nodes until identifying a level in the hierarchical classification that does meet these criteria.

Using this technique, the operation 320 may predict an association between a particular target data item and a level in the hierarchical classification that is not necessarily a lowest level. This is unlike the operation 316 which selects between terminal nodes.

In one illustration of the operation 320, a set of terminal nodes of a hierarchical classification may have probabilities that are equivalent to one another (e.g., all 10%). In this illustration, the system may not be able to select between these (nearly) equally probable terminal nodes because the probabilities are nearly indistinguishable. Furthermore, the system may determine that the probabilities associated with these terminal nodes is less than a minimum required threshold of 25% probability.

Upon applying the operation 320 and determining that the threshold is not met, the system may analyze the next level above the indistinguishable terminal level. Continuing with the illustration, the system identifies one parent node as having a probability of 20% and another parent node as having a probability of 80%. Because the parent node having a probability of 80% exceeds the minimum threshold of 25% and the other parent node does not exceed this threshold, the system identifies this non-terminal node as the node (and corresponding classification) most likely associated with a target data item.

Similar to the operation 320, the operation 324 may determine a ratio of probabilities between child nodes and a corresponding parent node. The system uses this ratio to determine whether to predict that a target data item is associated with a child node or its parent.

For example, the system may set a parent:child probability ratio threshold at 2:1. That is, if the probability associated with the parent is twice as great as the child, then the system selects the parent node to associate with a target data item. Below that ratio threshold, the system selects the child node to associate with the target data item. Much like the operation 320, the operation 324 is a selection criteria that balances precision (e.g., identifying a narrower category with a target data item) with accuracy (e.g., identifying a broader category that is more likely to be correct). The ratio threshold may be selected for any value.

The operation 328 presents a selection criteria in which hyperplanes of probabilities are associated with nodes. The hyperplanes include regions of probability that are associated with a prediction that a target data item is likely categorized by a particular terminal node and other regions of probability that are associated with a prediction that the target data item is likely categorized by a higher level, non-terminal node.

In the operation 328, a generalized linear threshold may define a hyperplane in a space of probabilities, within which regions are associated with proper selection of some categories over others. At a high level, regions of a hyperplane defined by a matrix of linear inequalities may be used with a vector of node probabilities to determine whether to predict a classification at terminal node level or higher level.

In some examples, an objective function (e.g., a classification metric to evaluate a model, such as f1 score) may be maximized based on a selection of the categorization in this operation 328. That is, a matrix of linear inequalities (have a number of rows equal to a number of levels in the classification hierarchy) may be generated by using a vector of node probabilities and vectors associated with objective function thresholds to be optimized. The resulting matrix diagonal values are set to 1. The linear inequalities may each define a hyperplane in the space of all probabilities and the matrix collectively delineate the partitions of probabilities in the probability space. A binary vector indicating which inequalities satisfy or do not satisfy the inequality may define a polyhedron in the probability space, within which node selections may be made that minimize the objective cost function.

Similar to the operation 320, which set a uniform threshold for all nodes at a particular level of the hierarchy, the operation 332 sets individual thresholds for each node independently from one another. If a probability for a target data item is not met for a particular terminal category, the system analyzes parent nodes that are progressively higher in the hierarchy until a minimum probability is met.

In the operation 336, an algorithm ("objective function") may be applied to select between nodes based on a "cost" of an erroneous classification. At a high level, the operation 336 uses a function that describes the added resource consumption of an incorrect classification to partition probability space into regions of higher and lower probability.

In the operation 336, a target data item may be analyzed by the system to identify a subset of two or more categories/nodes that are possible categorizations for the data item. While some of the operations described above use criteria to select between possible categorizations (whether peer categories or parent/child categories) based on the relative probabilities of the categories, the operation 336 determines an objective cost of incorrectly selecting one category over another. This objective cost function may be based on the candidate categories and/or target data item characteristics. This objective cost function may predict computational, financial, or other resource costs (e.g., added labor, inaccurately or improper resource assignment).

In a variation of the operation 336, the operation 340 uses an ensemble tree in which algorithms such as random forest or gradient boosted trees are used to partition probability space. As with the operation 336, a cost function may be used to determine which categorizations are more or less "costly" if ultimately incorrect. The system may then minimize the cost using the random forest or gradient boosted tree algorithms in order to determine a probable categorization.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
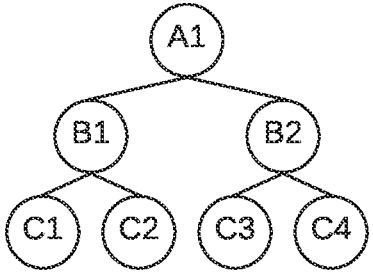
FIGS. 4A, 4B, and 4C schematically illustrate an example application of selected operations depicted in FIG. 2.
Figure 4B:
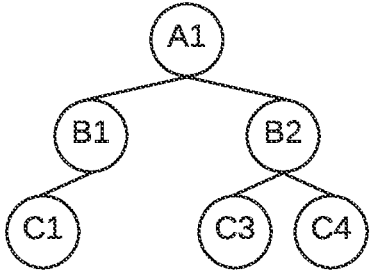
Figure 4C:
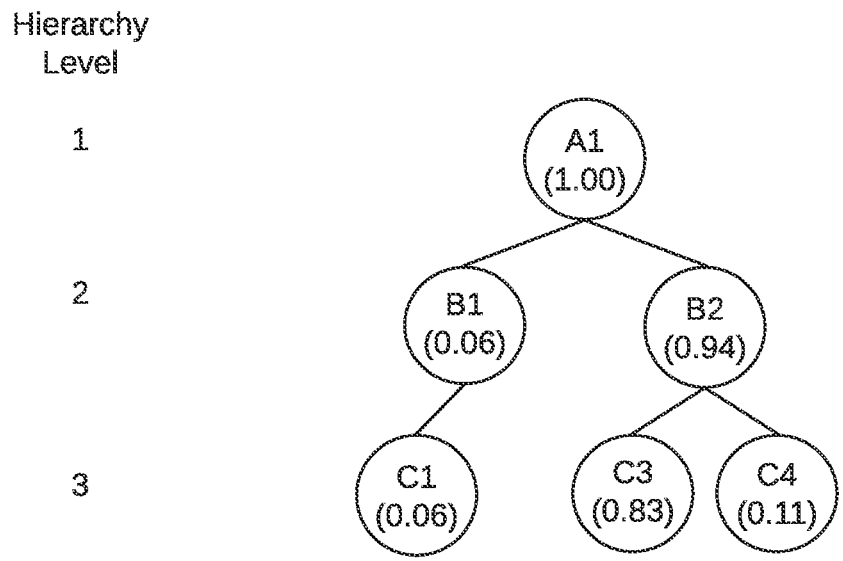

FIGS. 4A-4C schematically illustrate various aspects of the method 200.

FIG. 4A illustrates an embodiment in which a system generates a hierarchical classification and representative tree structure based on training data. As shown, the hierarchical classification includes 3 hierarchy levels with level 1 being the highest, most general, level and level 3 being the lowest, most specific level. As also illustrated, the hierarchical classification follows: level 1 is classified as "A1"; level 2 is "A1/B1" for a first branch and "A2/B2" for a second branch; and level 3 is "A1/B1/C1" and "A1/B1/C2" for the first branch and "A1/B1/C3" and "A1/B1/C4" for the second branch. In this example, C1, C2, C3, and C4 are leaf nodes.

FIG. 4B illustrates a pruned hierarchy in which leaf node C2 (and its associated hierarchical classification) is pruned for not being associated with a sufficient number of data items. The system sets the probability of C2 is to zero and its data items and associated probabilities are redistributed so that a probability for each of levels 2 and 3 is equal to 1.

FIG. 4C illustrates probabilities generated by the system and associated with the pruned hierarchy. As shown, a sum of probabilities at each level equals 1.

The pruned hierarchy illustrated in FIG. 4C may be used to train an ML model. Once trained, the ML model may be subsequently applied to target data to classify a particular target data item in association with one of the nodes shown in FIG. 4C using the non-mandatory leaf assignment techniques described above.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
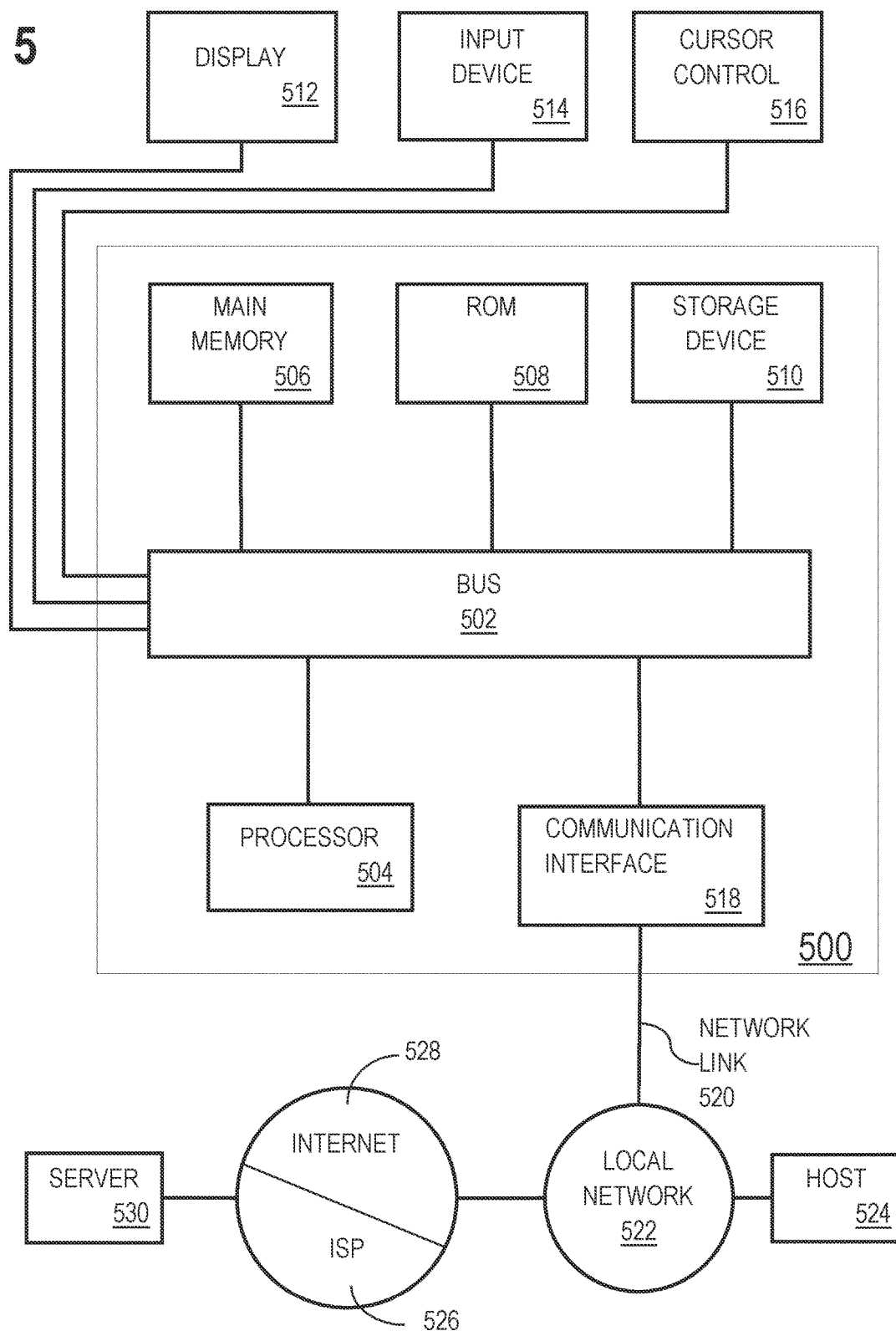
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    obtaining a training data set for training a machine learning model, the training data set comprising a plurality of data items, wherein each of the data items of the plurality comprises a corresponding set of characteristics;
    applying a classifier machine learning model to the plurality of data items, to generate a hierarchical classification of categories, represented by a hierarchical tree of nodes, at least by classifying each data item of the plurality of data items into a corresponding category of the hierarchical classification of categories;
    pruning the hierarchical classification of categories to generate a revised training data set, at least by:
        identifying a first category of the hierarchical classification of categories represented by a first node in the hierarchical tree of nodes, wherein a parent category of the first category is represented by a second node in the hierarchical tree of nodes wherein the first node is a leaf node and the second node is a non-leaf node;
        determining that a number of data items in a subset of data items of the plurality of data items, corresponding to a first category of the hierarchical classification of categories, does not meet a minimum data item threshold:
            recategorizing the subset of data items from the first category to the parent category of the first category in the hierarchical classification of categories to generate the revised training data set for training the machine learning model;
            removing the first node from the hierarchical tree of nodes;
            wherein the second node is associated with at least one child node subsequent to removal of the first node;
    training the machine learning model using the revised training data set to generate a trained machine learning model;
    receiving a target data item set to be classified; and
    applying the trained machine learning model to the target data item set to identify classifications corresponding to data items of the target data item set;
    wherein applying the trained machine learning model to the target data items comprises identifying a non-terminal classification as corresponding to a particular data item, the non-terminal classification selected based on a ratio of probabilities between the non-terminal classification and a connected terminal classification above a threshold value.

2. The media of claim 1, wherein applying the trained machine learning model to the target data item set further comprises assigning a first probability of a target data item corresponding to a first category in a first level of the hierarchical classification of categories and a second probability of the target data item corresponding to a second category in the first level, wherein the first level consists of the first category and the second category and wherein the sum of the first probability and the second probability is one.

3. The media of claim 1, wherein applying the trained machine learning model to the target data items further comprises assigning probabilities of a target data item corresponding to respective categories in a first level of the hierarchical classification of categories wherein the sum of the probabilities across all categories of the first level is one.

4. The media of claim 1, wherein applying the trained machine learning model to the target data item set further comprises assigning probabilities of a target data item corresponding to respective categories in each level of the hierarchical classification of categories wherein the sum of the probabilities across all categories of the levels is one.

5. The media of claim 1, wherein applying the trained machine learning model to the target data item set further comprises removing from consideration a first classification for a particular data item, the first classification at a terminal level of the hierarchical classification of categories having a first probability below a minimum probability threshold.

6. The media of claim 1, wherein applying the trained machine learning model to the target data item set further comprises identifying a particular classification for a particular data item, the particular classification at a terminal level of the hierarchical classification of categories having a highest probability of the classifications at the terminal level.

7. A method comprising:
    obtaining a training data set for training a machine learning model, the training data set comprising a plurality of data items, wherein each of the data items of the plurality comprises a corresponding set of characteristics;
    applying a classifier machine learning model to the plurality of data items, to generate a hierarchical classification of categories, represented by a hierarchical tree of nodes, at least by classifying each data item of the plurality of data items into a corresponding category of the hierarchical classification of categories;
    pruning the hierarchical classification of categories to generate a revised training data set, at least by:
        identifying a first category of the hierarchical classification of categories represented by a first node in the hierarchical tree of nodes, wherein a parent category of the first category is represented by a second node in the hierarchical tree of nodes wherein the first node is a leaf node and the second node is a non-leaf node;
        determining that a number of data items in a subset of data items of the plurality of data items, corresponding to a first category of the hierarchical classification of categories, does not meet a minimum data item threshold:
            recategorizing the subset of data items from the first category to the parent category of the first category in the hierarchical classification of categories to generate the revised training data set for training the machine learning model;
            removing the first node from the hierarchical tree of nodes;
            wherein the second node is associated with at least one child node subsequent to removal of the first node;

training the machine learning model using the revised training data set to generate a trained machine learning model;
receiving a target data item set to be classified; and
applying the trained machine learning model to the target data item set to identify classifications corresponding to data items of the target data item set;
wherein applying the trained machine learning model to the target data items comprises identifying a non-terminal classification as corresponding to a particular data item, the non-terminal classification selected based on a ratio of probabilities between the non-terminal classification and a connected terminal classification above a threshold value.

8. The method of claim 7, wherein applying the trained machine learning model to the target data items further comprises assigning a first probability of the target data item corresponding to a first category in a first level of the hierarchical classification of categories and a second probability of the target data item corresponding to a second category in the first level, wherein the first level consists of the first category and the second category and wherein the sum of the first probability and the second probability is one.

9. The method of claim 7, wherein applying the trained machine learning model to the target data items further comprises assigning probabilities of the target data item corresponding to respective categories in a first level of the hierarchical classification of categories wherein the sum of the probabilities across all categories of the first level is one.

10. The method of claim 7, wherein applying the trained machine learning model to the target data items further comprises assigning probabilities of the target data item corresponding to respective categories in each level of the hierarchical classification of categories wherein the sum of the probabilities across all categories of the levels is one.

11. The method of claim 7, wherein applying the trained machine learning model to the target data items further comprises removing from consideration a first classification for the particular data item, the first classification at a terminal level of the hierarchical classification of categories having a first probability below a minimum probability threshold.

12. The method of claim 7, wherein applying the trained machine learning model to the target data items further comprises identifying a particular classification for the particular data item, the particular classification at a terminal level of the hierarchical classification of categories having a highest probability of the classifications at the terminal level.

13. A system comprising:
at least one device including a hardware processor;
the system being configured to perform operations comprising:
obtaining a training data set for training a machine learning model, the training data set comprising a plurality of data items, wherein each of the data items of the plurality comprises a corresponding set of characteristics;
applying a classifier machine learning model to the plurality of data items, to generate a hierarchical classification of categories, represented by a hierarchical tree of nodes, at least by classifying each data item of the plurality of data items into a corresponding category of the hierarchical classification of categories;
pruning the hierarchical classification of categories to generate a revised training data set, at least by:
identifying a first category of the hierarchical classification of categories represented by a first node in the hierarchical tree of nodes, wherein a parent category of the first category is represented by a second node in the hierarchical tree of nodes wherein the first node is a leaf node and the second node is a non-leaf node;
determining that a number of data items in a subset of data items of the plurality of data items, corresponding to a first category of the hierarchical classification of categories, does not meet a minimum data item threshold:
recategorizing the subset of data items from the first category to the parent category of the first category in the hierarchical classification of categories to generate the revised training data set for training the machine learning model;
removing the first node from the hierarchical tree of nodes;
wherein the second node is associated with at least one child node subsequent to removal of the first node;
training the machine learning model using the revised training data set to generate a trained machine learning model;
receiving a target data item set to be classified; and
applying the trained machine learning model to the target data item set to identify classifications corresponding to data items of the target data item set;
wherein applying the trained machine learning model to the target data items comprises identifying a non-terminal classification as corresponding to a particular data item, the non-terminal classification selected based on a ratio of probabilities between the non-terminal classification and a connected terminal classification above a threshold value.

14. The system of claim 13, wherein applying the trained machine learning model to the target data item set further comprises assigning a first probability of a target data item corresponding to a first category in a first level of the hierarchical classification of categories and a second probability of the target data item corresponding to a second category in the first level, wherein the first level consists of the first category and the second category and wherein the sum of the first probability and the second probability is one.

15. The system of claim 13, wherein applying the trained machine learning model to the target data item set further comprises assigning probabilities of a target data item corresponding to respective categories in a first level of the hierarchical classification of categories wherein the sum of the probabilities across all categories of the first level is one.

16. The system of claim 13, wherein applying the trained machine learning model to the target data item set further comprises assigning probabilities of a target data item corresponding to respective categories in each level of the hierarchical classification of categories wherein the sum of the probabilities across all categories of the levels is one.

17. The system of claim 13, wherein applying the trained machine learning model to the target data item set further comprises removing from consideration a first classification for a particular data item, the first classification at a terminal level of the hierarchical classification of categories having a first probability below a minimum probability threshold.

18. The system of claim 13, wherein applying the trained machine learning model to the target data item set further comprises identifying a particular classification for a particular data item, the particular classification at a terminal level of the hierarchical classification of categories having a highest probability of the classifications at the terminal level.

* * * * *